United States Patent Office 2,788,328
Patented Apr. 9, 1957

2,788,328
CLEANSING COMPOSITION

Andrew E. Merget, Poughkeepsie, N. Y., assignor to The De Laval Separator Company, Poughkeepsie, N. Y., a corporation of New Jersey No Drawing. Application December 26, 1952, Serial No. 328,140

3 Claims. (Cl. 252—135)

This invention relates to cleansing compositions and particularly to a dry mix composition adapted for cleaning milking equipment, such as "pipe line" milking machine installations.

Present-day milking machine installations include many feet of closed piping and requisite accessories, such as milk pumps, milk holding and releasing jars, etc. Such installations are not easily disassembled to permit cleaning of the parts separately. In view of the difficulty incident to complete disassembly of the system, water solutions of standard dairy cleansers have been flushed through the system in an attempt to clean it without substantial disassembling. It has been found that with such a washing procedure using cleansers heretofore available, a visible deposit is eventually left on the surfaces of the system which are exposed to the milk flow. From an analysis of the deposited material, it was found that the greater part of the deposit consists of "milkstone," a mixture of the oxides of phosphorus and calcium with a faint trace of protein matter which forms whenever the cleaning of milker equipment is not thorough. Traces of ammonium chlorides and sulfonates were found also, the presence of which may be explained only from an analysis of the usual ingredients comprising standard dairy cleansers, since no source from which the same could be derived is present in milk. It appears that the aforementioned traces are derived from the sterilizing agent and wetting agent, respectively, included in standard dairy cleansers.

Recent developments in pipe line milkers include the use of transparent glass pipe for all milk carrying lines. The formation of a deposit on such glass pipe, to say the least, is unsightly. It was further found that when the glass piping was disassembled and scrubbed, using conventional procedures for "milkstone" removal, the interior of the piping was discolored or etched and the original degree of transparency could not be re-established. An investigation of this phenomena indicated that the glass had an affinity for and attracted the front or hydrophobic end of a chain reaction set up by the usual sanitizers and wetting agents included in standard dairy cleansers.

It is an object of this invention to provide a cleansing composition of high efficiency and which, at the same time, avoids the difficulties above mentioned.

Due to the accepted manner of cleaning pipe line milkers, that is, by the flushing method, the foaming or "sudsing" of standard dairy cleansers has proven particularly detrimental in that it is practically impossible to thoroughly rinse the piping. It is another object of this invention to provide an efficient cleansing composition for the purpose mentioned which will not froth or foam.

Another object of the invention is to provide, for the aforementioned purpose, a cleansing composition in the form of a dry powder having good keeping qualities and a high pH value.

A composition according to this invention comprises sodium hydroxide (NaOH), sodium tripolyphosphate ($Na_5P_3O_{10}$), sodium carbonate ($Na_2CO_3$), sodium metasilicate ($Na_2SiO_3 9H_2O$), and trisodium phosphate ($Na_3PO_4$). The proportion of sodium hydroxide may vary from 1 to 3 percent, but is preferably between 1½ and 2½ percent by weight. The sodium tripolyphosphate is in the proportion of 20 to 50 percent, but is preferably between 25 and 45 percent. The sodium carbonate may vary between 4 and 10 percent, but is preferably between 6 and 9 percent. The proportion of sodium metasilicate may vary between 40 and 60 percent, but is preferably between 45 and 55 percent; and the proportion of trisodium phosphate may vary between 2 and 10 percent, but is preferably between 3 and 8 percent.

A specific composition which is preferred for a cleansing compound in accordance with this invention, and which has proven highly efficient for the purpose of flush-washing a pipe line milking installation, comprises sodium hydroxide about 2%, sodium tripolyphosphate about 35%, sodium carbonate about 8%, sodium metasilicate about 50%, and trisodium phosphate about 5%, all proportions being specified by weight.

A cleansing composition made according to this invention is a dry powder having a high pH value, and therefore it is highly alkaline and has good sanitizing qualities. Since no wetting agent, as such, is required in the composition, it can be used for the purpose specified without foaming.

The composition is prepared for use in a milking system by mixing with water, preferably in the proportion of about 1 ounce of the composition to 3 gallons of warm water. The total volume of mix required will depend, of course, on the size and extent of the milking system. Between 20 and 40 gallons of mix at a temperature between 80° and 135° F. have proven satisfactory in actual use for a typical system.

Of the components of the new cleansing compound, the sodium hydroxide, sodium carbonate, and sodium metasilicate are the active cleansing ingredients. The first-mentioned component provides free caustic to saponify the fats present in the equipment and has high germicidal power; the second, when mixed with water, breaks down into the very active sodium oxide and furnishes considerable alkalinity, about one-half of which is active; and the third component, which is an alkali with wetting agent characteristics, supplies further alkalinity. This ingredient is anti-corrosive and has excellent deflocculating characteristics.

Of the remaining components of the cleansing compound, sodium tripolyphosphate is included primarily as a water softening agent and trisodium phosphate functions as an additional germicidal agent and, in addition, has excellent emulsifying and dispersing characteristics.

It is possible, of course, to add a minor proportion of another material or materials for the purpose of color identification in commerce, etc.

I claim:
1. A cleansing composition for cleaning glass pipe lines of milking machine installations, which consists essentially of, by weight, 1 to 3% sodium hydroxide, 20 to 50% sodium tripolyphosphate, 4 to 10% sodium carbonate, 40 to 60% sodium metasilicate, and 2 to 10% trisodium phosphate, said composition being free of any glass etching agent and any wetting agent which promotes foaming of an aqueous solution of said composition, whereby said solution is non-foaming and avoids etching of the glass pipe lines.

2. A cleansing composition for cleaning glass pipe lines of milking machine installations, which consists essentially of, by weight, 1½ to 2½% sodium hydroxide, 25 to 45% sodium tripolyphosphate, 6 to 9% sodium carbonate, 45 to 55% sodium metasilicate, and 3 to 8% trisodium phosphate, said composition being free of any glass etching agent and any wetting agent which promotes foaming of an aqueous solution of said composition, whereby said solution is non-foaming and avoids etching of the glass pipe lines.

3. A cleansing composition for cleaning glass pipe lines of milking machine installations, which consists essentially of, by approximate weight, 2% sodium hydroxide, 35% sodium tripolyphosphate, 8% sodium carbonate, 50% sodium metasilicate, and 5% trisodium phosphate, said composition being free of any glass etching agent and any wetting agent which promotes foaming of an aqueous solution of said composition, whereby said solution is non-foaming and avoids etching of the glass pipe lines.

References Cited in the file of this patent

FOREIGN PATENTS

| | | |
|---|---|---|
| 390,751 | Great Britain | Apr. 13, 1933 |
| 540,528 | Great Britain | Oct. 21, 1941 |

OTHER REFERENCES

Chemical Formulary, Bennett. Chem. Pub. Co., New York. Vol. 6 (1943) pp. 481 and 482, vol. 9 (1951) p. 510.

Sodium Tripoly Phosphate, Monsanto Tech. Bulletin No. P-139, July 8, 1949, 5 pages.